United States Patent
Shepard et al.

(10) Patent No.: US 6,929,018 B2
(45) Date of Patent: Aug. 16, 2005

(54) UNDERGROUND STORAGE TANK METERING SYSTEM IN A SERVICE STATION ENVIRONMENT

(75) Inventors: Robert Shepard, Jamestown, NC (US); Timothy E. Dickson, Greensboro, NC (US); David L. Kaehler, Greensboro, NC (US); Ray J. Hutchinson, Houma, LA (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 10/819,536

(22) Filed: Apr. 7, 2004

(65) Prior Publication Data

US 2004/0187933 A1 Sep. 30, 2004

Related U.S. Application Data

(62) Division of application No. 10/389,516, filed on Mar. 14, 2003.

(51) Int. Cl.$^7$ .................................................. E03B 1/00
(52) U.S. Cl. ................. 137/1; 137/565.16; 137/565.17; 73/40.5 R; 73/861.77; 417/43; 222/23
(58) Field of Search .............................. 137/1, 565.16, 137/565.17; 73/40.5 R, 861.77; 417/43; 222/23

(56) References Cited

U.S. PATENT DOCUMENTS

| | | | |
|---|---|---|---|
| 1,595,633 A | 8/1926 | Thwaits | |
| 3,120,325 A | 2/1964 | Tye et al. | |
| 3,318,479 A | 5/1967 | Houle | 222/23 |
| 4,131,216 A | * 12/1978 | Gerstenmaier et al. | 222/52 |
| 4,349,882 A | * 9/1982 | Asmundsson et al. | 702/52 |
| 4,876,530 A | 10/1989 | Hill et al. | 340/605 |
| 4,977,528 A | 12/1990 | Norris | 364/571.04 |
| 5,040,577 A | 8/1991 | Pope | 141/59 |
| 5,056,017 A | * 10/1991 | McGarvey | 705/28 |
| 5,072,621 A | * 12/1991 | Hasselmann | 73/40.5 R |
| 5,285,922 A | 2/1994 | Harding | 220/553 |

(Continued)

FOREIGN PATENT DOCUMENTS

| EP | 0584924 A1 | 7/1993 |
|---|---|---|
| GB | 850603 | 6/1957 |
| WO | WO 01/04586 A1 | 1/2001 |

OTHER PUBLICATIONS

"Chapter B13: Double Containment Piping System Design," Christopher G. Ziu, Piping Handbook, Seventh Edition, pp. 569–649, 2000.
"4" Submersible Pumps Installation, Operation, Service and Repair Parts, Red Jacket® Quantum™, May 2000.

*Primary Examiner*—A. Michael Chambers
(74) *Attorney, Agent, or Firm*—Withrow & Terranova, PLLC (57) ABSTRACT

A meter coupled in close proximity to an underground storage tank fuel pipe that delivers fuel from the underground storage tank to fuel dispensers in a service station environment. The meter measures the total amount of fuel drawn from the underground storage tank. The meter may be placed in a submersible turbine pump or in the main conduit that carries fuel to the fuel dispensers. The meter measurement is compared to the meter measurements in the individual fuel dispensers that receive the fuel drawn from the underground storage tank to determine if a discrepancy exists. A discrepancy may be indicative of meter tampering, meter calibration issues, and/or a leak in the fuel pipeline between the underground storage tank and the fuel dispensers. A leak detection test may be automatically performed if such discrepancy exists and/or an alarm condition generated and communicated.

41 Claims, 6 Drawing Sheets

U.S. PATENT DOCUMENTS

| | | | |
|---|---|---|---|
| 5,317,899 A | 6/1994 | Hutchinson et al. | 73/40.5 |
| 5,319,545 A | 6/1994 | McGarvey et al. | 364/403 |
| 5,325,706 A * | 7/1994 | Grose | 73/40.5 R |
| 5,390,713 A | 2/1995 | Fiech | 141/98 |
| 5,400,253 A * | 3/1995 | O'Connor | 701/123 |
| 5,423,547 A | 6/1995 | Puso | 273/187.2 |
| 5,464,466 A | 11/1995 | Nanaji et al. | 94/45 |
| RE35,238 E | 5/1996 | Pope | 141/59 |
| 5,544,518 A | 8/1996 | Hart et al. | 73/1 H |
| 5,571,310 A | 11/1996 | Nanaji | 96/4 |
| 5,586,586 A | 12/1996 | Fiech | 141/98 |
| 5,626,649 A | 5/1997 | Nanaji | 95/12 |
| 5,665,895 A | 9/1997 | Hart et al. | 73/1.73 |
| 5,689,071 A | 11/1997 | Ruffner et al. | 73/861.84 |
| 5,734,851 A | 3/1998 | Leatherman et al. | 395/329 |
| 5,755,854 A | 5/1998 | Nanaji | 95/11 |
| 5,794,667 A | 8/1998 | Payne et al. | 141/128 |
| 5,843,212 A | 12/1998 | Nanaji | 95/4 |
| 5,956,259 A | 9/1999 | Hartsell, Jr. et al. | 364/528.37 |
| 5,985,002 A | 11/1999 | Grantham | 96/47 |
| 6,052,629 A | 4/2000 | Leatherman et al. | 700/241 |
| 6,070,760 A | 6/2000 | Kenney et al. | 222/55 |
| 6,109,477 A | 8/2000 | Myers et al. | 222/1 |
| 6,158,289 A * | 12/2000 | Taylor et al. | 73/861.27 |
| 6,170,539 B1 | 1/2001 | Pope et al. | 141/59 |
| 6,223,765 B1 | 5/2001 | Small et al. | 137/312 |
| 6,293,996 B1 | 9/2001 | Grantham et al. | 95/47 |
| 6,352,176 B1 | 3/2002 | Hartsell, Jr. et al. | 222/1 |

* cited by examiner

UNDERGROUND STORAGE TANK METERING SYSTEM IN A SERVICE STATION ENVIRONMENT

The present application is a divisional of U.S. patent application Ser. No. 10/389,516, filed Mar. 14, 2003, pending.

FIELD OF THE INVENTION

The present invention relates to a meter coupled to an underground storage tank that measures fuel delivered to fuel dispensers in a service station environment.

BACKGROUND OF THE INVENTION

In service station environments, fuel is stored underneath the service station in underground storage tanks (USTs). The USTs typically hold thousands of gallons of fuel. In order to transfer fuel from the USTs to fuel dispensers above the ground in the service station forecourt so that the fuel can be dispensed to vehicles, a submersible turbine pump (STP) is provided. The STP comprises a turbine and motor that draws fuel from the UST. After the fuel leaves the STP, the fuel is distributed via a main fuel piping conduit through the service station. Individual fuel dispensers draw fuel from the main fuel piping conduit via a branch conduit that is fluidly coupled to the main fuel piping conduit. The fuel is then delivered into the fuel dispenser, metered and dispensed to a vehicle through a hose and nozzle combination.

Each of the individual fuel dispensers contains meters that measure the amount of fuel dispensed to a vehicle. Since this fuel originates from USTs, the amount of fuel dispensed out of the USTs is the combination of all of the metered fuel dispensed out of the individual fuel dispensers. The fuel dispenser meter data is communicated to a single site controller (SC) at the service station. The SC uses the individual fuel dispenser meter data to track the inventory levels of the USTs and to generate reports on this inventory. The SC may also provide fuel dispenser meter data information to a tank monitor (TM) system as is described in U.S. Pat. Nos. 5,665,895; 5,544,518; and 4,977,528, all of which are incorporated by reference in their entirety. The TM uses the fuel dispenser meter data as a reference point to calibrate the tank-strapping curve for the UST. A tank-strapping curve is a curve that correlates a liquid level in the UST to a volume level.

There are several factors that could cause the fuel dispenser meter data to not be an accurate account of the amount of fuel drawn out of the USTs and delivered to the fuel dispensers. First, a person could have tampered with the fuel dispenser meter and/or electronics such that the amount of fuel dispensed to a vehicle is different than measured by the fuel dispenser meter. In a typical fraud scenario, the fuel dispenser meter is tampered to measure more fuel than is actually dispensed so that customers get charged for more fuel than is dispensed. Second, the fuel dispenser meter may not be properly calibrated. This will cause the fuel dispenser meter to not accurately reflect the amount of fuel dispensed. Third, there may be a leak present in the fuel piping between the UST and the fuel dispenser meters, which will cause the amount of fuel drawn out of the UST to be less that the amount of fuel measured and delivered by the fuel dispenser.

If any of the aforementioned events occur, the fuel dispenser meter data that is collected by the SC will not be accurate as well. If the TM uses the fuel dispenser meter data from the SC for calibration of the tank-strapping curve, the tank strapping curve will be inaccurate as well. Further, this condition could go unnoticed for long periods of time.

Therefore, there exists a need to be able to confirm absolutely the amount of fuel drawn out of the USTs so that this amount can be compared to the fuel dispenser meter measurements to ensure that fraud, calibration, and/or leak issues are not present in the service station environment. Further, it may be important to base the tank-strapping curve calibration on another baseline of the amount of fuel drawn out of the UST rather than using the measurements of the individual fuel dispenser meters.

SUMMARY OF THE INVENTION

The present invention relates to placement of a meter in the fuel piping that carries fuel drawn out of an underground storage tank (UST) to fuel dispensers in a service station environment. The meter measures all of the fuel that is drawn out of the UST before the fuel is delivered via the main and branch conduits to the individual fuel dispensers.

The meter may be placed inline to the fuel piping that delivers the fuel from the UST to the fuel dispensers, including in the submersible turbine pump (STP) and any other location in the main conduit. The meter may be a positive displacement or inferential meter. A turbine meter is used in one embodiment since turbine meters are known to require minimal or no recalibration after the meter is installed and operational.

A controller compares the amount of fuel drawn from the UST and delivered to the individual fuel dispensers with the fuel measured by the individual fuel dispenser meters in order to determine if there is a discrepancy. If not, the process continues in a looping fashion. If there is a discrepancy, this is indicative of either fraud, a leak, or a meter(s) becoming uncalibrated. The controller may generate an alarm in response to detection of such discrepancy, and initiate a leak detection test to determine if there is a leak in the underground fuel piping.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
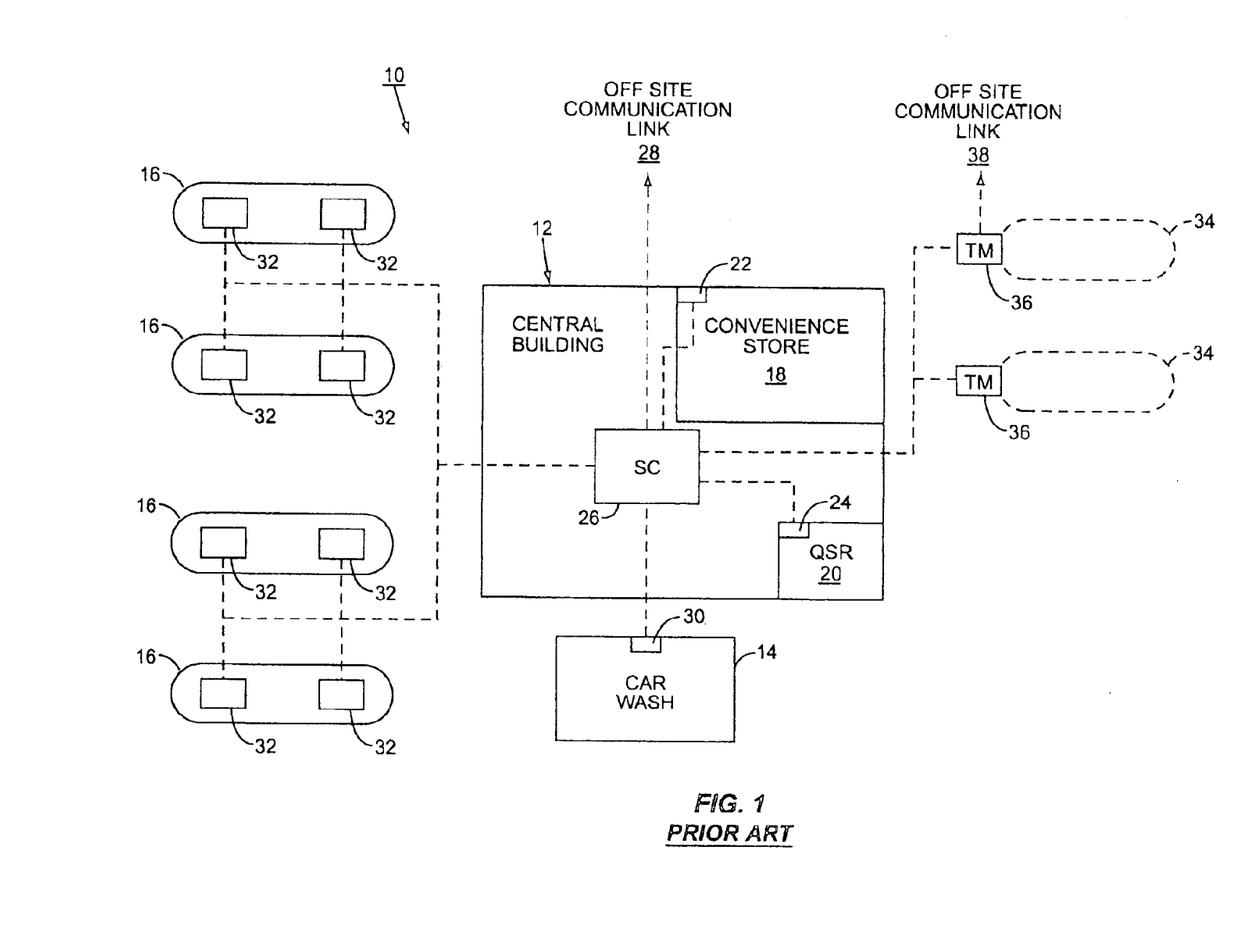
FIG. 1 illustrates communication connections in an exemplary fueling environment.
Figure 2:
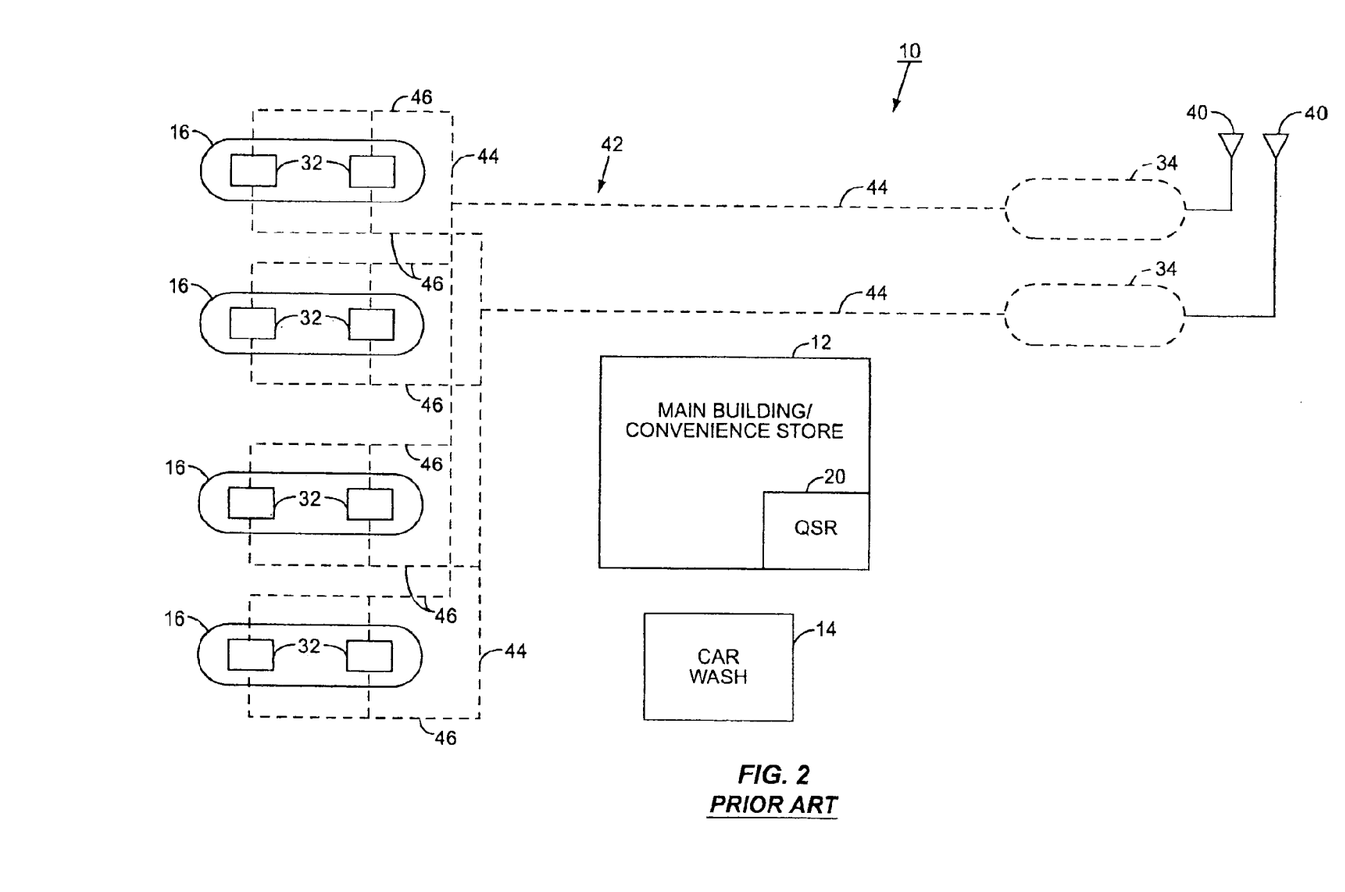
FIG. 2 illustrates fluid connections in an exemplary fueling environment.

Fueling environments come in many different designs. Before describing the particular aspects of the present invention (which begins at the description of FIG. 3), a brief description of a fueling environment follows. A conventional, exemplary fueling environment 10 is illustrated in FIGS. 1 and 2. Such a fueling environment 10 may comprise a central building 12, a car wash 14, and a plurality of fueling islands 16.

The central building 12 need not be centrally located within the fueling environment 10, but rather is the focus of the fueling environment 10, and may house a convenience store 18 and/or a quick serve restaurant 20 therein. The convenience store 18 and/or quick server restaurant 20 may also be present at a truck stop facility rather than a primary non-truck vehicle filling station. Both the convenience store 18 and the quick serve restaurant 20 may include a point of sale 22, 24, respectively. The central building 12 may further house a site controller (SC) 26, which in an exemplary embodiment may be the G-SITE® sold by Gilbarco Inc. of Greensboro, N.C. The SC 26 may control the authorization of fueling transactions and other conventional activities as is well understood. The SC 26 may be incorporated into a point of sale, such as point of sale 22, if needed or desired. Further, the SC 26 may have an off-site communication link 28 allowing communication with a remote location for credit/debit card authorization, content provision, reporting purposes, or the like, as needed or desired. The off-site communication link 28 may be routed through the Public Switched Telephone Network (PSTN), the Internet, both, or the like, as needed or desired.

The car wash 14 may have a point of sale 30 associated therewith that communicates with the SC 26 for inventory and/or sales purposes. The car wash 14 alternatively may be a stand alone unit. Note that the car wash 14, the convenience store 18, and the quick serve restaurant 20 are all optional and need not be present in a given fueling environment 10.

The fueling islands 16 may have one or more fuel dispensers 32 positioned thereon. The fuel dispensers 32 may be, for example, the ECLIPSE® or ENCORE® sold by Gilbarco Inc. of Greensboro, N.C. The fuel dispensers 32 are in electronic communication with the SC 26 through a LAN or the like.

The fueling environment 10 also has one or more underground storage tanks (USTs) 34 adapted to hold fuel therein. As such, the UST 34 may be a double-walled tank. Further, each UST 34 may be associated with a tank monitor (TM) 36, or one TM 36 may handle all the USTs 34. The TMs 36 typically have fluid level sensors and other data gathering devices positioned in the USTs 34 which are communicatively coupled to the TM 36. In some implementations, the TM 36 may be positioned in the central building 12; however, because the TMs 36 monitor fluid levels within the USTs 34, the TMs 36 are shown schematically positioned next to the USTs 34. The TMs 36 may communicate with the fuel dispensers 32 (either through the SC 26 or directly, as needed or desired) to determine amounts of fuel dispensed and compare fuel dispensed to current levels of fuel within the USTs 34 as reported by the sensors to determine if the USTs 34 are leaking.

The TM 36 may communicate with the SC 26 and further may have an off-site communication link 38 for leak detection reporting, inventory reporting, or the like. Much like the off-site communication link 28, the off-site communication link 38 may be through the PSTN, the Internet, both, or the like. If the off-site communication link 28 is present, the off-site communication link 38 need not be present and vice versa, although both links may be present if needed or desired. Further, the off-site communication links 28, 38 may be incorporated into one single link. Further, the off-site communication link 28 may be associated with a back-office system (BOS) (not shown) rather than a SC 26 since a SC 26 may be linked to a BOS. As used herein, the TM 36 and the SC 26 are site communicators to the extent that they allow off-site communication and report site data to a remote location.

For further information on how elements of a fueling environment 10 may interact, reference is made to U.S. Pat. No. 5,956,259, which is hereby incorporated by reference in its entirety. Information about fuel dispensers may be found in commonly owned U.S. Pat. Nos. 5,734,851 and 6,052,629, which are hereby incorporated by reference in their entirety. Information about car washes may be found in commonly owned U.S. patent application Ser. No. 60/380,111, filed 06 May 2002, entitled "Improved service station car wash," which is hereby incorporated by reference in its entirety. An exemplary TM 36 is the TLS-350R manufactured and sold by Veeder-Root. For more information about TMs and their operation, reference is made to U.S. Pat. Nos. 5,423,457; 5,400,253; 5,319,545; and 4,977,528, which are hereby incorporated by reference in their entireties.

In addition to the various conventional communication links between the elements of the fueling environment 10, there are conventional fluid connections to distribute fuel about the fueling environment 10 as illustrated in FIG. 2. USTs 34 may each be associated with a vent 40 that allows over-pressurized tanks to relieve pressure thereby. A pressure valve (not shown) is placed on the outlet side of each vent 40 to open to atmosphere when the pressure in the UST 34 reaches a predetermined threshold. Additionally, under-pressurized tanks may draw air in through the vents 40. In an exemplary embodiment, two USTs 34 exist—one a low octane tank (87) and one a high-octane tank (93). Blending may be performed within the fuel dispensers 32, as is well understood, to achieve an intermediate grade or grades of fuel. Alternatively, additional USTs 34 may be provided for diesel and/or an intermediate grade of fuel (not shown). The vents 40 may be coupled to a post-processing system that is designed to filter hydrocarbons out of a vapor/air mixture in the UST 34 that is released through the vents 40 when a pressure valve (not shown) in the vents 40 opens after a threshold pressure is reached in the UST 34, like that described in U.S. Pat. Nos. 5,464,466; 5,571,310; 5,626,649; 5,755,854; 5,843,212; 5,985,002; and 6,293,996, all of which are incorporated herein by reference in their entireties.

Pipes 42 connect the USTs 34 to the fuel dispensers 32. The pipes 42 may be arranged in a main conduit 44 (also called a main fuel piping) and branch conduit 46 configuration, where the main conduit 44 carries the fuel from the USTs 34 to the branch conduits 46, and the branch conduits 46 connect to the fuel dispensers 32. Typically, the pipes 42 are double-walled pipes comprising an inner conduit and an outer conduit. Fuel flows in the inner conduit to the fuel dispensers 32, and the outer conduit insulates the environment from leaks in the inner conduit. For a better explanation of such pipes and concerns about how they are connected, reference is made to Chapter B13 of PIPING HANDBOOK, 7$^{th}$ edition, copyright 2000, published by McGraw-Hill, which is hereby incorporated by reference.

In a typical service station installation, leak detection may be performed by a variety of techniques, including probes and leak detection cables. More information about such devices can be found in the previously incorporated PIPING HANDBOOK. Conventional installations capture the leaked fuel in low point sumps, sumps in the fuel dispensers 32, or the like, where the fuel mixes with contaminants such as dirt, water, and the like, thereby ruining the fuel for future use without processing.

While not shown, vapor recovery systems may also be integrated into the fueling environment 10, with vapor recovered from fueling operations being returned to the USTs 34 via separate vapor recovery lines (not shown). For more information on vapor recovery systems, the interested reader is directed to U.S. Pat. Nos. 5,040,577; 6,170,539; and Re. 35,238; and U.S. patent application Ser. No. 09/783, 178 filed 14 Feb. 2001, all of which are hereby incorporated herein by reference in their entireties.

Figure 3A:
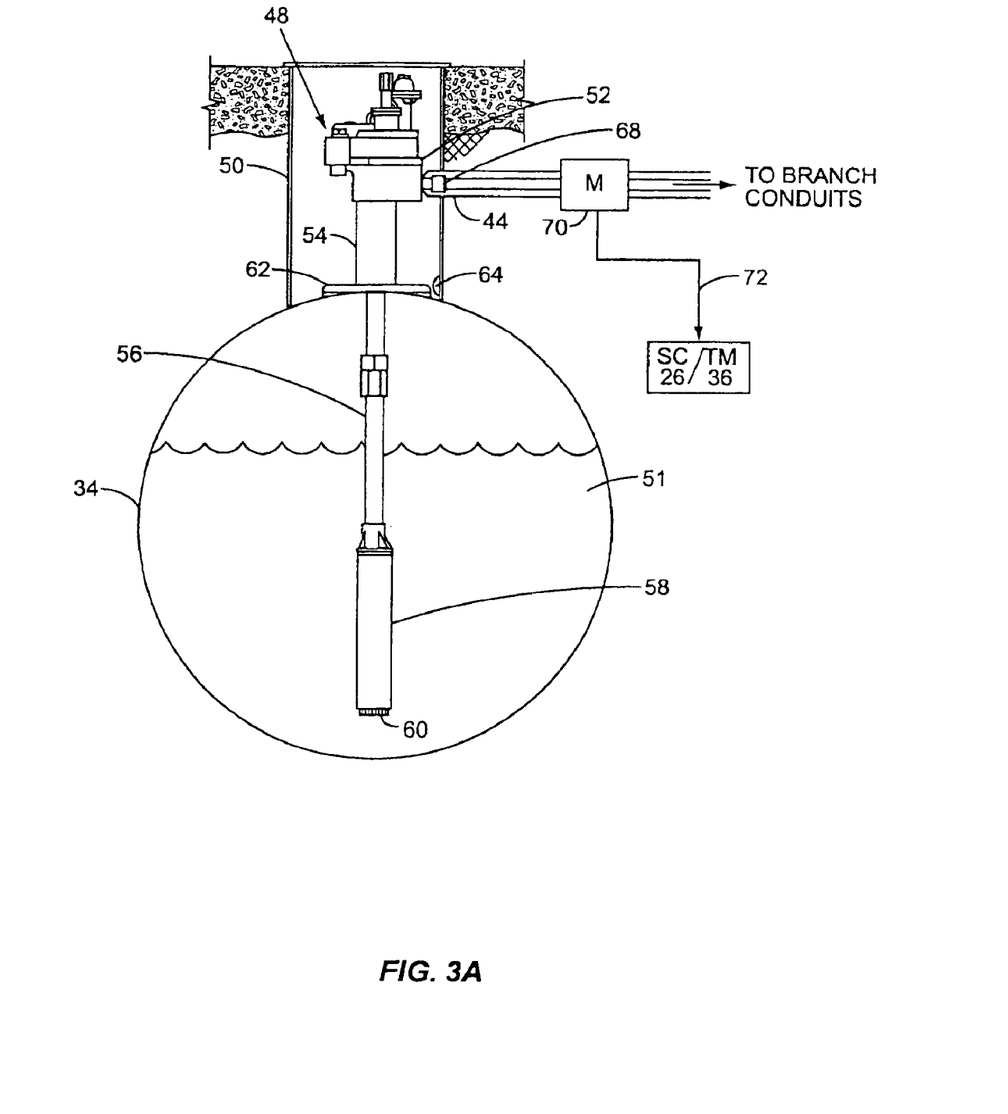
FIG. 3A illustrates a meter coupled inline to fuel piping that carries fuel drawn from an underground storage tank (UST) to fuel dispensers.
Figure 3B:
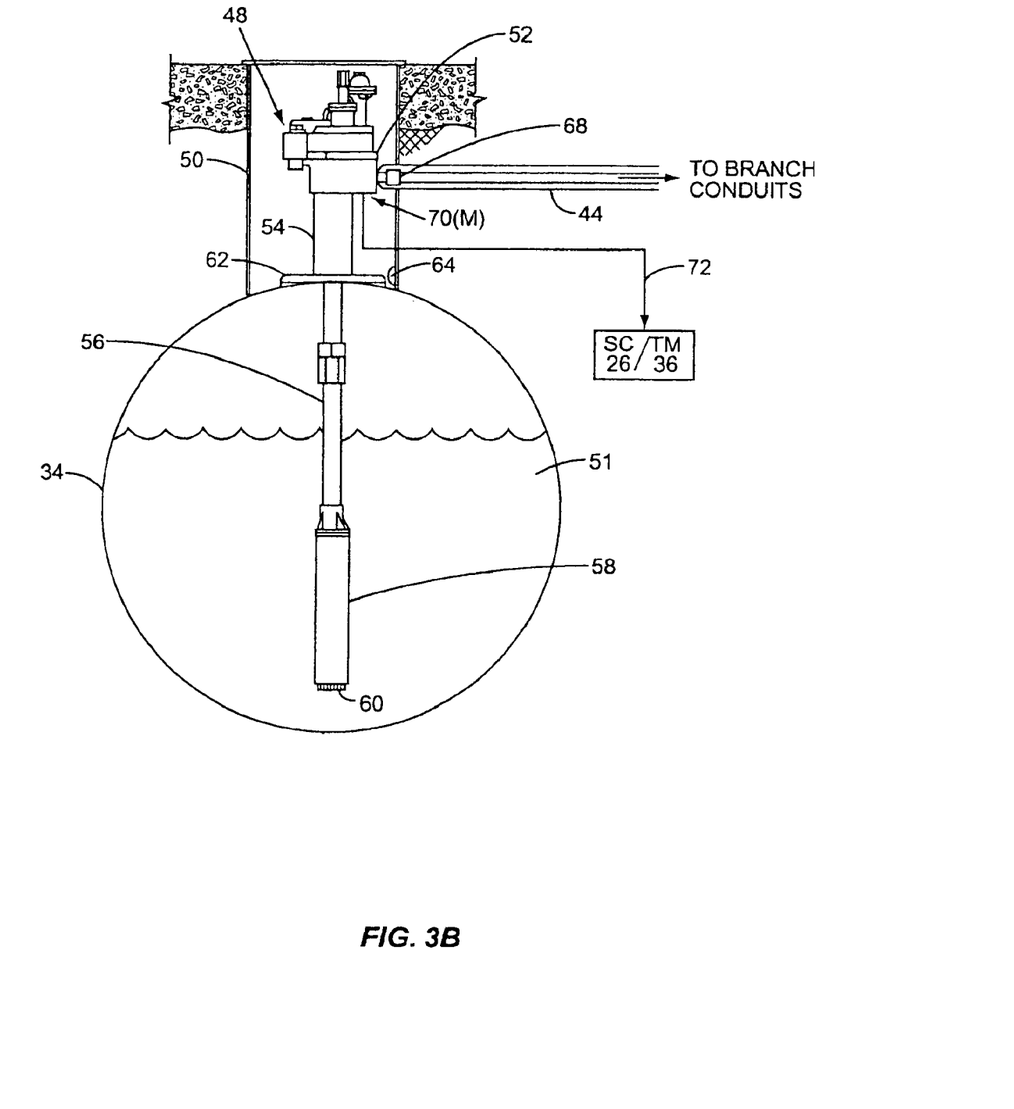
FIG. 3B illustrates an alternative configuration to FIG. 3A wherein the meter is coupled in the submersible turbine pump (STP) housing.
Figure 3C:
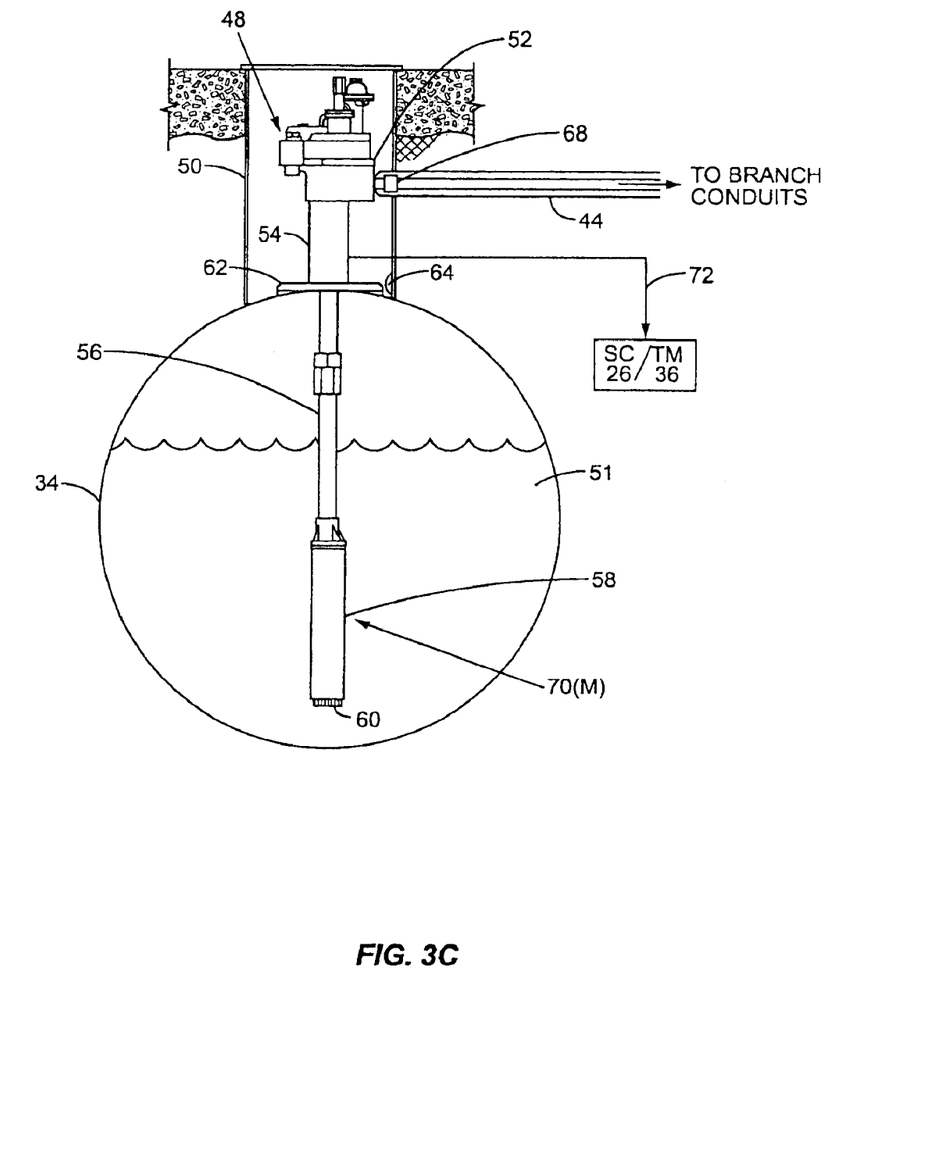
FIG. 3C illustrates an alternative configuration to FIG. 3A housing.

Now turning to the present invention, as illustrated in FIGS. 3A–3C, a submersible turbine pump (STP) 48 is shown that is fluidly coupled to the UST 34. The STP 48 is contained inside a sump 50. The sump 50 captures any fuel leaks that occur in the STP 48. The sump 50 may contain a sump sensor 64 that detects any fuel 51 that leaks from the STP 48. If the main conduit 44 is single-walled piping, active testing must take place to detect leaks including detection of leaks in the sump 50 using the sump sensor 64 and fuel dispenser sumps (not shown). The sump sensor 64 may be any type of leak detection sensor.

The STP 48 comprises a STP housing 52 for control electronics (not shown). The STP 48 is fluidly coupled to the fuel 51 in the UST 34 via a fuel piping (not shown) contained inside a riser pipe 54 and boom 56. The boom 56 is connected to a turbine housing 58 that contains a turbine (not shown). The STP 48 is typically mounted to the UST 34 using a mounting plate 62. The control electronics causes the turbine to rotate and pressurize the inside of the turbine housing 58 and the boom 56 thereby drawing fuel 51 from the UST 34 through a turbine housing inlet 60. The fuel 51 travels upward through the fuel piping extending from the turbine housing 58 through the boom 56 and riser pipe 54 to the STP housing 52. The main conduit 44 is coupled to the STP housing 52 to carry fuel 51 drawn from the UST 34 to the branch conduits 46.

For a more complete explanation of the STP 48 and supporting components, reference is made to U.S. Pat. No. 6,223,765 assigned to Marley Pump Company, which is incorporated herein by reference in its entirety, and the product exemplifying the teachings of the patent explained in Quantum Submersible Pump Manual: Installation and Operation, also produced by the Marley Pump Company, also incorporated by reference in its entirety.

In FIG. 3A, a first embodiment of the invention is disclosed. A meter 70 is placed inline to the main conduit 44 to measure the total amount of fuel 51 drawn out of the UST 34. In this manner, the total amount of fuel 51 drawn out of the UST 34, via the STP 48 described above, is measured in the main conduit 44 at one location rather than downstream after the main conduit 44 has split into branch conduits 46. Since USTs 34 only store one grade or octane of fuel, the system illustrated in FIG. 3A is for measuring the total amount of fuel 51 drawn out of a given UST 34. If multiple grades of fuel 51 are stored in multiple USTs 34, multiple systems like that described in FIG. 3A may be used. A leak detection sensor 68 may also be placed in the inner annular space of the main conduit 44 to detect leaks, as is well known.

The meter 70 may any type of meter, including but not limited to positive displacement or inferential meter. Since the meter 70 is in a location not necessarily easily accessible by service personnel, it may be advantageous to use a meter 70 that requires minimal or no calibration. One such meter is known as a turbine flow meter, as is described in U.S. Pat. No. 5,689,071, entitled "Wide range, high accuracy flow meter," incorporated herein by reference in its entirety. The turbine flow meter is an inferential meter and its advantages are described in the '071 Patent as well as co-pending U.S. patent application Ser. No. 10/227,746, filed on Aug. 26, 2002 entitled "Multi-metal turbine sensing for increased sensitivity and reduced cost," incorporated herein by reference in its entirety.

The main conduit 44 may be single walled piping or double-walled piping like that described in co-pending U.S. patent application Ser. No. 10/173,990, filed on Jun. 18, 2002 entitled "Service station leak detection and recovery system," incorporated herein by reference in its entirety.

If the main conduit 44 is double-walled piping, the meter 70 is configured to maintain the separation of the inner annular space and the outer annular space of the double-walled piping such that the secondary containment provided by the outer annular space of the double walled piping is maintained throughout the meter 70 and on the outlet side of the meter 70. The meter 70 may provide a path for the outer annular space of the double walled piping to divert around the meter 70, or the meter 70 may be configured to accept a double-walled piping as an input and output and maintain the integrity of the outer annular space.

Before the present invention, no meter 70 was used to measure the total amount of fuel 51 drawn out of the UST 34. Measurements from individual meters in fuel dispensers 32 were totaled up to derive the total amount of fuel 51 drawn from a UST 34. The individual fuel dispenser 32 meters only receive the fuel 51 drawn from the UST 34 after the fuel 51 travels from the STP 48 through a main conduit 44 and into branch conduits 46 coupled to the individual fuel dispenser 32 meters. There could be any number of reasons that the individual fuel dispenser 32 meters will not accurately measure the amount of fuel 51 drawn from a UST 34. First, a person could have tampered with the fuel dispenser 32 meter and/or electronics such that the amount of fuel 51 dispensed to a vehicle is different than measured by the fuel dispenser 32 meter. In a typical fraud scenario, the fuel dispenser 32 meter is tampered to measure more fuel than is actually dispensed so that customers get charged for more fuel than is dispensed. Second, the fuel dispenser 32 meter may not be properly calibrated. This will cause the fuel dispenser 32 meter to not accurately reflect the amount of fuel 51 dispensed. Third, there may be a leak present in the main conduit 44 or branch conduits 46 between the UST 34 and the fuel dispenser 32 meters, which will cause the amount of fuel 51 drawn out of the UST 34 to be less that the amount of fuel 51 measured and delivered by the fuel dispensers 32.

If any of the aforementioned events occur, the fuel dispenser 32 meter data that is collected by the SC 26 will not be accurate as well. If the TM 36 uses the fuel dispenser 32 meter data from the SC 26 for calibration of the tank-strapping curve, as is described for example in U.S. Pat. Nos. 4,977,528; 5,544,518; 5,665,895, all of which are incorporated herein by reference in their entireties, the tank-strapping curve will be inaccurate as well. More information on the operational aspects of the present invention is provided below in FIGS. 4–6; but first, alternative meter 70 placement configurations are described below for FIGS. 3B and 3C.

FIG. 3B illustrates an alternative placement of the meter 70. In FIG. 3B, the meter 70 is placed in the STP 48 and specifically in the STP housing 52. In this embodiment, the meter 70 is placed in the STP 48 which is inside the sump 50 so that any leaked fuel around the meter 70 is captured in the sump 50. In this manner, it is not necessary for the meter 70 to accept the outer annular space of the main conduit 44 or to provide a bypass of the outer annular space of the main conduit 44 around the meter 70, if the main conduit 44 is double-walled piping.

FIG. 3C illustrates another alternative placement of the meter 70, wherein the meter 70 is placed in the turbine housing 58. All of the previous discussion regarding the meter 70 that is discussed in FIGS. 3A and 3B is also applicable here and is therefore not repeated.

In summary, the meter 70 may be placed in any location in the STP 48, including the turbine housing 58, the boom 56, the riser pipe 54, the STP housing 48, and the main conduit 44, such that the meter 70 receives all fuel 51 drawn from the UST 34 at a single location in order to measure the total amount of fuel 51 drawn from the UST 34 to be later delivered to the fuel dispensers 32.

In each of the aforementioned embodiments of the meter 70 placement illustrated in FIGS. 3A–3C, the meter 70 generates a data signal 72 that is indicative of the total amount of fuel 51 passing through the meter 70. The data signal 72 is a signal that represents the total amount of fuel 51 drawn from the UST 34. The signal 72 may be a direct representation of the total amount of fuel 51 or may be a signal 72 that is used to derive the total amount of fuel 51. This data signal 72 may be generated using a pulser as is described in U.S. Pat. No. 6,109,477, entitled "Signature pulse generator and method of detecting tampering with a fueling operation." This data signal 72 is electrically coupled to either the SC 26, the TM 36, or other controller to calculate the total amount of fuel 51 drawn from the UST 34. The SC 26, TM 36 or other controller also collects data from the individual fuel dispenser 32 meters as well. In this application when the term "controller" is used, the controller may be the SC 26, the TM 36 or any other type of controller that is capable of receiving the data signal 72 and calculating the total amount of fuel 51 drawn from the UST 34. It is with this information that the operational aspects of the present invention are described.

Figure 4:
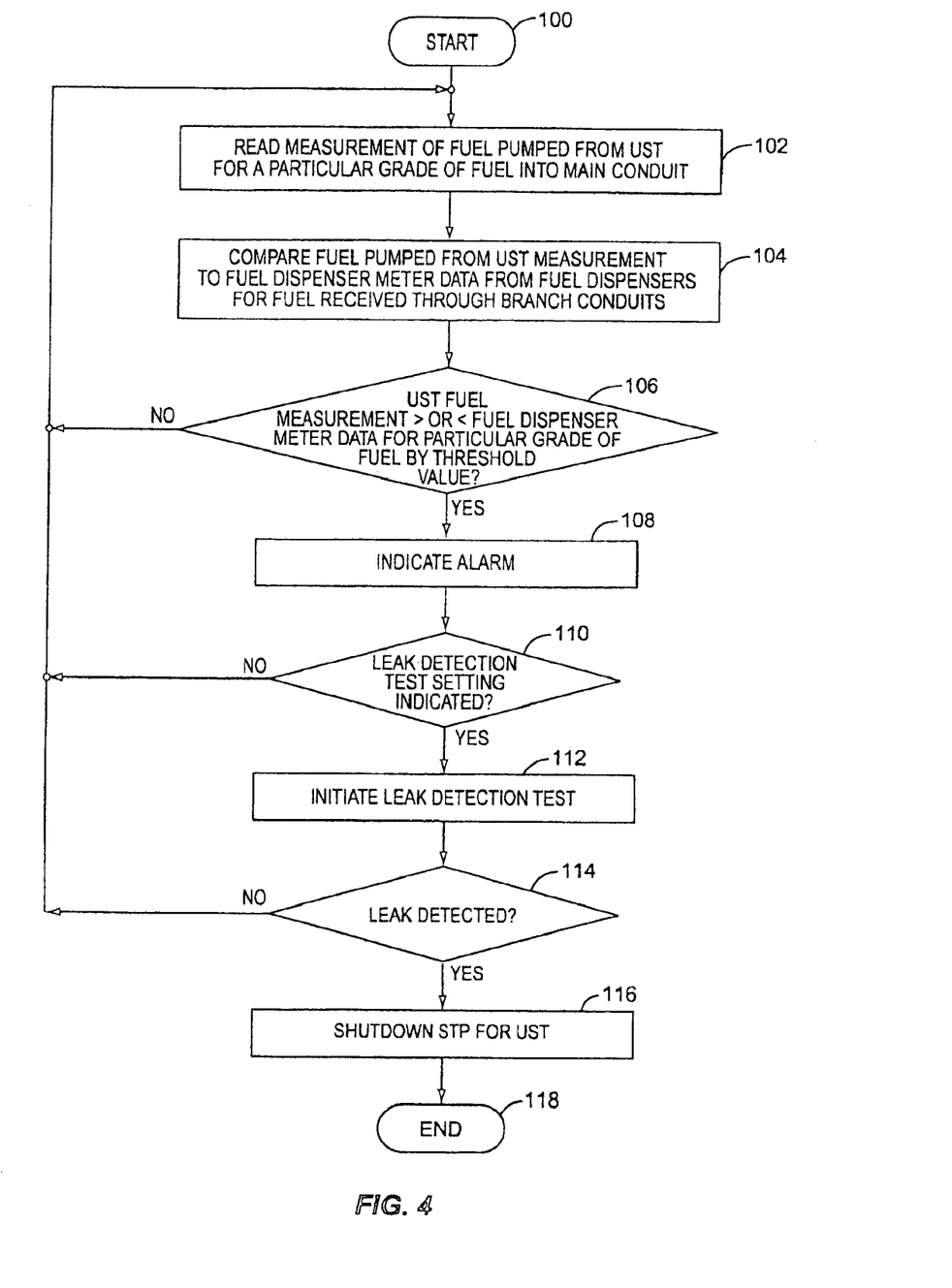
FIG. 4 illustrates a flowchart diagram of using the metered amount of fuel from the UST to perform diagnostic operation.

FIG. 4 illustrates the operational aspect of the present invention wherein the total amount of fuel 51 measured by the meter 70 is compared to the individual fuel measurements from the fuel dispenser 32 meters to determine if there is a discrepancy. A discrepancy is an indication of three possible events. First, a leak could exist between the meter 70 and the individual fuel dispenser 32 meters such that all of the fuel 51 measured by the meter 70 never reaches one or more of the individual fuel dispenser 32 meters for measurement. A leak could exist in the main conduit 44 or a branch conduit 46. Second, a fraudulent or tampering activity could have occurred at one or more of the individual fuel dispenser 32 meters such that the meter data communicated to the controller 26, 36 is not accurate. Tampering in this manner usually involves causing one or more individual fuel dispenser 32 meters to register an amount of fuel 51 greater than the actual amount of fuel 51 passing through the fuel dispenser 32 meter so that the customer is charged as if more fuel 51 was dispensed into his or her vehicle than was actually dispensed. Third, one or more of the individual fuel dispenser 32 meters may not be properly calibrated or may be out of calibration such that the amount of fuel 51 measured by the individual fuel dispenser 32 meters is not accurate.

The processing carried out by the process illustrated in FIG. 4 may be performed in the SC 26, the TM 36, other controller, or through a combination of these various control elements (hereinafter referred to as "controller").

In FIG. 4, a process is illustrated where the controller 26, 36 determines if there is a discrepancy between the amount of fuel 51 measured from the meter 70 and the amount of fuel 51 measured by the individual fuel dispensers 32. The process starts (block 100), and the amount of fuel measured by the meter 70 drawn from the UST 34 for a particular grade of fuel 51 is determined using the data signal 72 (block 102). Next, this amount of fuel from the meter 70 is compared to the individual fuel dispenser 32 meter data received through the branch conduits 46 (block 104). If there is a discrepancy such that the amount of fuel 51 measured by the meter 70 from the UST 34 is greater than or less than the amount of fuel measured by the individual fuel dispenser 32 meters by a threshold value (decision 106), an alarm condition exists.

If the UST 34 for a particular grade of fuel 51 that is metered by meter 70 contains a post-processor system for filtering the vapor/air mixture that is released through the vent 40 due to overpressure conditions in the UST 34, an optional feature would be for the controller 26, 36 to take any hydrocarbons released through the vent 40 into consideration as calculating the amount of fuel in the in block 102.

If no alarm condition exists (decision 106), the process continues in a looping fashion to check for a discrepancy between the amount of fuel 51 drawn from the UST 34, as measured by the meter 70 (block 102), compared with the amount of fuel 51 measured by the individual fuel dispensers 32 (block 104).

If an alarm condition exists, a general alarm is indicated such that it is known that there is either a leak in the main conduit 44 or branch conduits between the meter 70 and the fuel dispenser 32 meter, or the fuel dispenser 32 meter is miscalibrated or has been fraudulently tampered with (block 108). The alarm condition may be communicated to a user, to the SC 26 and/or the TM 36. An alarm may comprise a visual and/or audio signal to an operator of the service station or to a remote location via the off-site communication link 28 or off-site communication link 38, or both. The alarm condition may trigger certain predefined steps of investigation including but not limited to a site survey, shutting down the STP 48 associated with the meter 70, and performing a line leak detection test. The alarm condition may also be stored in memory (not shown) associated with the controller 26, 36 in a log file and/or in a log file in memory associate with the remote location. Further, the remote location can send such alarm condition to another location, including but not limited to headquarter sites, regulatory authorities, such as Weights & Measures, etc.

In addition, the TM 36 may be configured so that a line leak detection test is automatically triggered once an alarm condition is generated (block 108). This is because at this point, it is not known whether the discrepancy between the fuel 51 measured by the meter 70 from the UST 34 is different from that of the individual fuel dispenser 32 meters because of a leak, fraud, or calibration issues. Given the fact that early leak detection is important in a service station environment, it may be desirable for the system to automatically trigger a leak detection test. This leak detection test may be any type of leak detection test including but not limited to those described in U.S. Pat. Nos. 4,876,530 and 5,317,899, all of which are incorporated herein by reference in their entireties If a leak detection test setting is indicated (decision 110), the controller 26, 36 will initiate a leak detection test (block 112). If a leak is detected (decision 114), any number of actions can be taken that are normally taken, including but not limited to shutting down the STP 48 associated with the UST 34 containing a particular grade of fuel (block 116), or generating an alarm. Thereafter, the process ends (block 118) with respect to the particular UST 34 until the service action takes place. If a leak is not detected (decision 114), the controller 26, 36 indicates an alarm that is indicative of either fraud or miscalibration and not a leak since the line leak detection test resulted in no leak detected in decision 114. The process repeats itself (block 102) since the alarm condition was not generated as a result of a leak, and fuel 51 can still be dispensed from the UST 34 in an environmentally safe manner even though such alarm condition exists. In an alternative embodiment, the STP 48 for the particular fuel dispenser 32 where a discrepancy is found may be shut down, regardless of whether the alarm condition is indicative of a leak or not.

If the controller 26, 36 has the ability to receive fuel dispenser 32 meter data from each fuel dispenser 32 meter on a meter-by-meter basis, the controller 26, 36 can perform the comparison in block 104 for a particular fuel dispenser 32 meter on an individual meter basis rather than collectively. Even if the controller 26, 36 does not have the ability to receive fuel dispenser 32 meter data from each fuel dispenser 32 meter on a meter-by-meter basis, it may nevertheless still be possible for the controller 26, 36 to deduce when a specific fuel dispenser 32 meter measures fuel in discrepancy with meter 70.

Those skilled in the art will recognize improvements and modifications to the preferred embodiments of the present invention. All such improvements and modifications are considered within the scope of the concepts disclosed herein and the claims that follow.

What is claimed is:

1. A system for detecting a discrepancy between the amount of fuel drawn from an underground storage tank to a plurality of fuel dispensers and the amount of fuel measured by the plurality of fuel dispensers, comprising:
   a controller;
   a submersible turbine pump fluidly coupled to fuel in the underground storage tank wherein said submersible turbine pump draws the fuel out of the underground storage tank;
   a main fuel piping coupled to said submersible turbine pump to carry the fuel drawn by said submersible turbine pump to the fuel dispenser;
   a meter coupled inline to said main fuel piping that measures the amount of fuel drawn by said submersible turbine pump from the underground storage tank and delivered to the fuel dispenser, wherein said meter electronically communicates the amount of fuel drawn by said submersible turbine pump to said controller; and
   a plurality of fuel dispensers that each receives the fuel from a branch fuel piping coupled to said main fuel piping, wherein each of said plurality of fuel dispensers contains a fuel dispenser meter to measure the amount of the fuel received from said branch fuel piping and wherein said fuel dispenser meter electronically communicates the amount of fuel received from said branch conduit to said controller;
   said controller is adapted to compare said amount of fuel received from said branch conduits and said amount of fuel drawn by said submersible turbine pump.

2. The system of claim 1, wherein said meter is a turbine meter.

3. The system of claim 1, wherein said controller is included in a device comprised from the group consisting of a site controller and a tank monitor.

4. The system of claim 1, wherein said controller is adapted to determine any discrepancy between the amount of fuel received from said branch conduits and the amount of fuel drawn by said submersible turbine pump.

5. The system of claim 4, wherein said controller generates an alarm if said amount of fuel received from said branch conduits is different than said amount of fuel drawn by said submersible turbine pump.

6. The system of claim 5, wherein said alarm is comprised from the group consisting of a fraud alarm, a leak alarm, and a calibration alarm.

7. The system of claim 4, wherein said controller initiates a leak detection test if said amount of fuel received from said branch conduits is different than said amount of fuel drawn by said submersible turbine pump.

8. The system of claim 7, wherein said leak detection test is comprised from the group consisting of a leak detection test for said main fuel piping and a leak detection test for said branch fuel piping.

9. The system of claim 7, wherein said leak detection test is comprised from the group consisting of a gross leak detection test, a precision leak detection test at 0.2 gallons per hour, and a precision leak detection test at 0.1 gallons per hour.

10. The system of claim 7, wherein said controller is adapted to stop the draw of fuel from the underground storage tank if said leak detection test fails.

11. The system of claim 4, wherein said controller communicates any said discrepancy to a remote location.

12. The system of claim 1, wherein said controller generates an alarm when the amount of fuel drawn by said submersible turbine pump exceeds a threshold level.

13. The system of claim 12, wherein said alarm is communicated to a remote location.

14. The system of claim 1, wherein said controller determines which of said fuel dispenser meters in said plurality of fuel dispenser meters is in discrepancy with said meter.

15. The system of claim 1, wherein said controller is adapted to stop the draw of fuel from the underground storage tank by the submersible turbine pump if said amount of fuel received from said branch conduits is different than said amount of fuel drawn by said submersible turbine pump.

16. A system for detecting a discrepancy between the amount of fuel drawn from an underground storage tank to a plurality of fuel dispensers and the amount of fuel measured by the plurality of fuel dispensers, comprising:
   a controller;
   a submersible turbine pump fluidly coupled to fuel in the underground storage tank wherein said submersible turbine pump draws the fuel out of the underground storage tank;

a main fuel piping coupled to said submersible turbine pump to carry the fuel drawn by said submersible turbine pump to the fuel dispenser;

a meter placed in said submersible turbine pump that measures the amount of fuel drawn by said submersible turbine pump from the underground storage tank and delivered to the fuel dispenser; and a plurality of fuel dispensers that each receives the fuel from a branch fuel piping coupled to said main fuel piping, wherein each of said plurality of fuel dispensers contains a fuel dispenser meter to measure the amount of the fuel received from said branch fuel piping and wherein said fuel dispenser meter electronically communicates the amount of fuel received from said branch fuel piping to said controller;

said controller is adapted to compare said amount of fuel received from said branch conduits and said amount of fuel drawn by said submersible turbine pump.

17. The system of claim 16, wherein said meter is a turbine meter.

18. The system of claim 16, wherein said meter is placed in a turbine housing of said submersible turbine pump.

19. The system of claim 16, wherein said meter is placed in a boom of said submersible turbine pump.

20. The system of claim 16, wherein said meter is placed in a riser pipe of said submersible turbine pump.

21. The system of claim 16, wherein said meter is placed in a submersible turbine pump housing of said submersible turbine pump.

22. The system of claim 16, wherein said controller is included in a device comprised from the group consisting of a site controller and a tank monitor.

23. The system of claim 16, wherein said controller is adapted to determine any discrepancy between said amount of fuel received from said branch conduits and said amount of fuel drawn by said submersible turbine pump.

24. The system of claim 23, wherein said controller generates an alarm if said amount of fuel received from said branch conduits is different than said amount of fuel drawn by said submersible turbine pump.

25. The system of claim 24, wherein said alarm is comprised from the group consisting of a fraud alarm, a leak alarm, and a calibration alarm.

26. The system of claim 23, wherein said controller initiates a leak detection test if said amount of fuel received from said branch conduits is different than said amount of fuel drawn by said submersible turbine pump.

27. The system of claim 26, wherein said leak detection test is comprised from the group consisting of a leak detection test for said main fuel piping and a leak detection test for said branch fuel piping.

28. The system of claim 26, wherein said leak detection test is comprised from the group consisting of a gross leak detection test, a precision leak detection test at 0.2 gallons per hour, and a precision leak detection test at 0.1 gallons per hour.

29. The system of claim 26, wherein said controller is adapted to stop the draw of fuel from the underground storage tank if said leak detection test fails.

30. The system of claim 23, wherein said controller communicates any said discrepancy to a remote location.

31. The system of claim 16, wherein said controller is adapted to stop the draw of fuel from the underground storage tank by the submersible turbine pump if said amount of fuel received from said branch conduits is different than said amount of fuel drawn by said submersible turbine pump.

32. A method of measuring the amount of fuel drawn from an underground storage tank that is delivered to a plurality of fuel dispensers in a service station environment, comprising the steps of:

drawing an amount of fuel from the underground storage tank; and measuring the amount of fuel drawn from the underground storage tank using a meter fluidly coupled to fuel in the underground storage tank before the fuel is delivered to the plurality of fuel dispensers;

delivering the amount of fuel delivered to the plurality of fuel dispensers;

measuring the amount of fuel dispensed by each of the plurality of fuel dispensers after said step of measuring the amount of fuel drawn from the underground storage tank by the meter; and comparing the amount of fuel received by the plurality of fuel dispensers and the amount of fuel drawn from the underground storage tank.

33. The method of claim 32, further comprising the step of communicating said amount of fuel drawn from the underground storage tank to a controller.

34. The method of claim 32, further comprising the step of determining any discrepancy between the amount of fuel received from the plurality of fuel dispensers and the amount of fuel drawn from the underground storage tank.

35. The method of claim 34, further comprising the step of generating an alarm if said amount of fuel received from said branch conduits is different than said amount of fuel drawn from the underground storage tank.

36. The method of claim 34, further comprising the step of initiating a leak detection test if said amount of fuel received from said branch conduits is different than said amount of fuel drawn from the underground storage tank.

37. The method of claim 36, further comprising the stopping the draw of fuel from the underground storage tank if said leak detection test fails.

38. The method of claim 34, further comprising the step of communicating any said discrepancy to a remote location.

39. The method of claim 34, further comprising the stopping the draw of fuel from the underground storage tank if said amount of fuel received from said branch conduits is different than said amount of fuel drawn from the underground storage tank.

40. The method of claim 32, wherein said meter is coupled inline to a main fuel piping that is fluidly coupled to fuel in the underground storage tank.

41. The method of claim 32, wherein said meter is placed in a submersible turbine pump that is fliudly coupled to fuel in the underground storage tank wherein said submersible turbine pump draws the fuel out of the underground storage tank.

* * * * *

UNITED STATES PATENT AND TRADEMARK OFFICE
CERTIFICATE OF CORRECTION

PATENT NO. : 6,929,018 B2
DATED : August 16, 2005
INVENTOR(S) : Robert Shepard et al.

It is certified that error appears in the above-identified patent and that said Letters Patent is hereby corrected as shown below:

Column 12,
Line 57, change "fliudly" to -- fluidly --.

Signed and Sealed this

First Day of November, 2005

JON W. DUDAS
*Director of the United States Patent and Trademark Office*